Nov. 1, 1955    F. L. KUREK    2,722,406
MAGNETIC CONVEYOR AND AGITATOR
Filed April 7, 1954
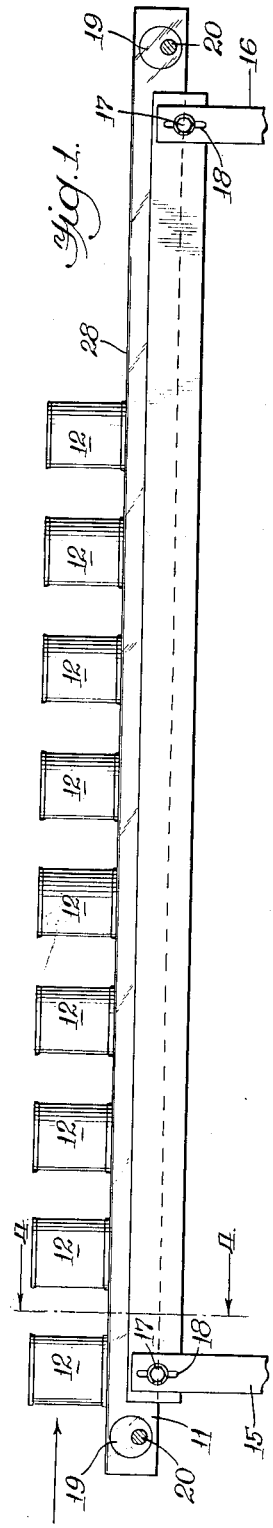
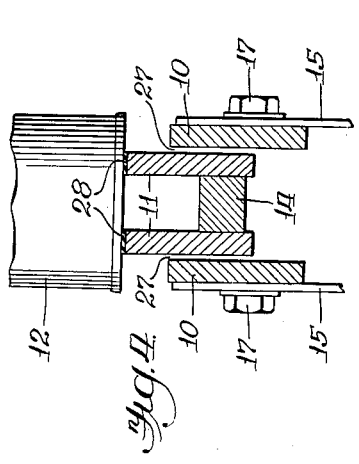
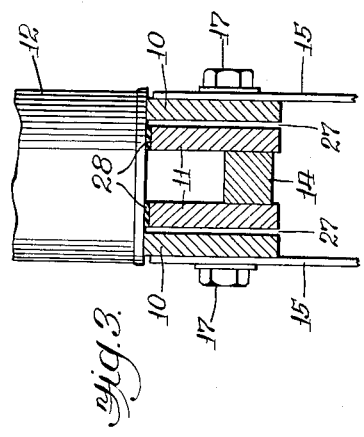
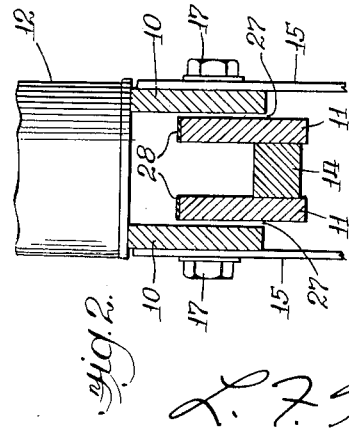
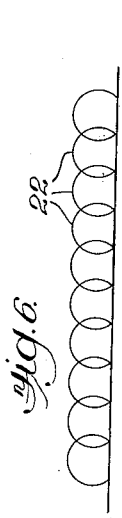
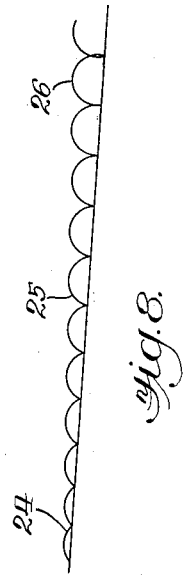
INVENTOR.
Frank L. Kurek
BY
L. F. Hammand
Atty.

United States Patent Office 2,722,406
Patented Nov. 1, 1955

2,722,406

MAGNETIC CONVEYOR AND AGITATOR

Frank L. Kurek, Maywood, Ill.

Application April 7, 1954, Serial No. 421,473

6 Claims. (Cl. 259—54)

This invention relates to mechanical conveying equipment, and particularly to a conveyor arranged and adapted to agitate the articles being conveyed simultaneously with the conveying action of the mechanism; yet to hold the articles firmly on the conveyor by magnetic means as they are being conveyed and agitated.

It is the specific object of the invention to provide a magnetic conveyor wherein cans or other ferrous metal items may be caused to move longitudinally over a metallic conveyor track, yet wherein the individual cans are at all time firmly held against a pair of supporting rails by magnetic attraction, the magnetic force being sufficient to overcome any likelihood of accidental dislodgement of the items from the track.

A further object of the invention is to provide a conveyor of such design and construction as to be capable of handling magnetically permeable articles of various sizes, shapes, weights and contours interchangeably, without modification or necessity of adjustment.

Another important object is the provision of a conveyor capable of adjustment in such a manner that the rate of progression of articles carried by it may be accelerated or decelerated at different zones along the length of a section of the conveyor. This is in sharp contrast to conventional conveying drives, wherein the rate of forward movement is necessarily constant throughout the length of the unit.

A still further object of the invention is the provision of a magnetic conveyor and agitator which is of extremely simple mechanical design and comprises relatively few working parts. A further object is a conveyor so arranged that the individual parts have a relatively small degree of movement with respect to each other, notwithstanding that the articles carried by the conveyor may be caused to move progressively along the entire length of the conveyor assembly.

Another object of the invention is the provision of a magnetic conveyor of such design and construction that it may be quickly and easily adjusted to alter its mechanical characteristics. This may involve an increase or decrease in the speed of movement of the articles being conveyed, an increase or decrease of agitation to which the articles are subjected, or both. In fact, the present machine is capable of adjustment such that a reduced longitudinal conveying speed may either be combined with considerable reduction in the degree of agitation imparted to the items, or by a marked increase in the violence of said agitation.

A still further object of the invention is the provision of a magnetic conveyor wherein adjustments as to speed of progression of the articles being handled and adjustments as to violence of agitation imparted to them may both be accomplished by adjustment of the stationary parts of the conveyor mechanism only; without requiring changes or adjustment in the speed, power or path of movement of the movable parts.

It is contemplated that a conveyor and agitator according to the present teachings may be employed for many and various purposes, but a typical use may be the conveying of cans of soup, milk or other liquid foods into and through a sterilizing chamber, for example, wherein it will be of advantage to agitate the contents of each individual can more or less violently as it is moved through the high temperature zone of the sterilizer. Simultaneous conveying and agitation of paint cans is another example.

The foregoing objects are accomplished in the present teaching by a conveyor assembly which consists essentially of a longitudinally extending metal track comprising two parallel pairs of steel rails. These rails have magnetic means for holding metal cans or other items in upstanding position on their upper surfaces. The articles carried by the conveyor are caused to move along the rail assemblies by relative movement of one set of rails with respect to the other, so that each individual item on the conveyor is periodically lifted from the surface of the stationary pair of rails by a pair of movable rails, moved a short step forward, and replaced on the stationary rails for a moment before the next successive forward step is taken. The preferred embodiment of the invention is illustrated in the drawings of this specification, wherein:

Figure 1 is a side elevational view of a typical conveyor constructed in accordance with these teachings;

Figure 2 is a detail transverse sectional view through the conveyor, showing the several parts in the position which they occupy as the articles carried by the conveyor are temporarily at rest on the stationary rails thereof;

Figure 3 is a detail sectional view similar to Figure 2 but showing the parts in the relative position which they occupy at the instant the articles carried by the conveyor are engaged by the movable rails of the assembly preparatory to being moved forward;

Figure 4 is a detail sectional view similar to Figures 2 and 3, but showing the parts in the positions they occupy as the articles are being stepped forward, the view being taken substantially on the line 4—4 of Figure 1; and Figures 5, 6, 7 and 8 are diagrammatic illustrations of the operation of the conveying mechanism under various conditions of adjustment arranged to achieve different longitudinal conveying speeds and varying degrees of agitation.

In general, the conveyor consists of a longitudinally extending metal track comprising a fixedly mounted pair of iron or steel rails 10 and a movable pair of iron or steel rails 11, with both of these pairs of rails spaced apart from each other sufficiently to adequately support the articles to be carried. As contemplated, such articles may be the cans 12 or other magnetically permeable articles. The movable pair of rails 11 are parallel with and closely adjacent the innermost walls of the rails 10 (Figures 2, 3 and 4), and the rails 11 have one or more magnets 14 positioned between their lower edges, so that when the parts are in the position of Figure 2 each of the rails 10 (which then project above the edges of the rails 11) acts as a pole piece for the magnets. Thus the lines of flux from the magnets then extend in a closed path through the magnets 14 and the rails 11 to the rails 10 and thence to the cans 12. This will hold the cans firmly in position on the upper surfaces of the rails 10.

The rails 10 are stationarily supported as by brackets 15 and 16, but provision is made so that the rails 10 may be vertically adjusted, and so that opposite paired ends of these rails may be adjusted independently of each other. This is useful to effect any desired characteristics of motion required, as will later appear. Adjusting means has been diagrammatically illustrated in the drawings as comprising bolts 17 and elongated slots 18. The rails 11 are arranged to be movable in a path having both longitudinal and vertical components of motion, however, so that the upper surfaces of the rails 11 will momentarily rise above the upper surfaces of the rails 10 during a portion of each cycle of their movement, and will move below the upper edges of the rails 10 during another portion of each cycle of movement. Conveniently, the required motion of the rails 11 may be imparted by moving both ends of each of these rails in a circular path as, for example, by means of a pair of eccentrics 19 mounted on synchronized rotary shafts 20. Thus, any given point on the upper surface of the rails 11 will be caused to move in a closed circular path, the lower portion of which is below the top level of the rails 10, with the upper portion of the path of movement describing an arc above the top of rails 10. It follows that the movement of rails 11 will cause them to move upwardly and engage the undersurface of the cans 12 as the rails 11 move up (Figure 3), and to lift the cans 12 from the rails 10 as shown in Figure 4. Also, the arcuate path of the rails 11 causes them to move longitudinally of the surfaces of the rails 10 in the upper arc of their movement. Thus, the motion of the rails 11 causes the individual cans 12 or other items on the conveyor to be momentarily lifted from the uppermost edges of the rails 10 and stepped forwardly before being again lowered into contact with the outer pair of rails. During this stepping motion, the cans are supported by the rails 11. The flux from the magnets 14 then passes directly through the rails 11 to the cans 12.

When the equipment is to be set for a moderate speed of longitudinal progression of the articles 12 along the conveyor, the relative positions of the rails 10 and 11 may be adjusted as in Figure 1. In such case, the path of movement of any given article along the conveyor rails is shown in Figure 5. The successive revolutions of the driving shafts 20 and eccentrics 19 of the conveyor will then move the cans 12 in the successive, short, arcuate steps of movement as indicated by the curves 21. It follows that the items are thus advanced along the conveyor at a moderate speed of travel and with moderate agitation. It is entirely practicable, however, to move the items along the conveyor at the same longitudinal speed as illustrated by the example of Figure 5, yet to impart a considerably more violent degree of agitation to the cans. This is achieved by adjusting the rails 10 as indicated in Figure 6, wherein the upper surface of the stationary rails 10 lies near the lower limit of movement of the rails 11. With this arrangement, the individual items carried by the conveyor are moved in the path indicated at 22 in Figure 6, so that each rotation of the eccentrics 19 moves the cans 12 in a longer and more curved path, and brings them downwardly into contact with the rails 10 more violently.

The maximum speed of longitudinal progression of the cans 12 is accomplished by the adjustment diagrammatically illustrated in Figure 7, wherein the cans are advanced by a series of semicircular steps 23. If desired, the rails 10 may be angularly inclined as in Figure 8, so that a relatively gentle motion is imparted at one end of the conveyor (where the items are moved in the path indicated by the curve 24), but wherein the speed of advance is increased as the items reach the zone of the curves 25, and the violence of agitation is increased as the items reach the zone of the curves 26.

It will be understood, of course, that the magnets 14 will hold the cans 12 on the conveyor throughout the movement of the rails 11 from the position of Figure 4 through the position of Figure 3 and to the position of Figure 2. The result of this arrangement is that while the cans or other items are moved progressively along the conveyor track, yet they are at all times firmly and quite positively held on the upper surface of the track by magnetic attraction. Nevertheless, the path of the magnetic lines of flux which hold the cans in position on the conveyor will undergo change. Thus, with the parts in the position of Figure 2, the lines of flux will extend from the magnets 14 to the rails 11, across the air gaps 27 between the rails 10 and 11, and thence upwardly through the rails 10 to the bottoms of the cans 12, whereas in the position of Figure 4, the upward movement of the rails 11 will cause the magnetic flux of the magnets to flow directly through the rails 11 to the cans. It follows that in certain instances it may be desirable to provide the rails 11 with thin strips of nonmagnetic material 28 along their upper edges, so that the magnetic reluctance of the flux path through the inside rails 11 is more comparable to the magnetic reluctance across the air gaps 27 and through the outer pair of rails 10, and the change of path of the magnetic flux is accomplished more readily.

Having thus described my invention, what I claim as new and desire to secure by United States Letters Patent is:

1. A magnetic conveyor comprising a longitudinally extending track having one pair of magnetically permeable rails parallel with each other and having at least one magnet extending between and directly engaging the lower portions of the rails whereby the upper surfaces of said rails act as poles of said magnet; a second pair of magnetically permeable rails parallel with and adjacent to said first rails, with the inner face of one rail of each pair spaced closely adjacent to the outer surface of one of the first mentioned rails; and means for relatively moving one of said pairs of rails longitudinally and vertically with respect to the other whereby any given point on one of the rails moves in a closed orbital path such that the motion of the rails causes magnetic flux from the aforementioned magnet to magnetically energize the upper surfaces of the two pairs of rails alternately, wherein the two pairs of rails will alternately grip articles being conveyed thereon and agitate the articles while advancing them longitudinally along the track in a step-by-step movement.

2. A magnetic conveyor comprising a longitudinally extending track having one pair of magnetically permeable rails parallel with each other and having at least one magnet whereby the upper surfaces of said rails act as poles of said magnet; a second pair of magnetically permeable rails parallel with and adjacent to said first rails, and means for relatively moving one of said pairs of rails longitudinally and vertically with respect to the other whereby any given point on one of the rails moves in a closed orbital path such that the motion of the rails causes magnetic flux from the aforementioned magnet to magnetically energize the upper surfaces of the two pairs of rails alternately, wherein the two pairs of rails will alternately grip articles being conveyed thereon and agitate the articles while advancing them longitudinally along the track in a step-by-step movement.

3. A magnetic conveyor comprising a longitudinally extending track having one pair of magnetically permeable rails parallel with each other and having at least one magnet whereby the upper surfaces of said rails act as poles of said magnet; a second pair of magnetically permeable rails, with each rail of said second pair spaced closely adjacent to one rail of the first mentioned pair; and means for relatively moving one of said pairs of rails with respect to the other and energizing the upper surfaces of the two pairs of rails alternately, wherein the two pairs of rails will alternately grip articles being conveyed thereon and advance them longitudinally along the track.

4. A magnetic conveyor comprising a longitudinally extending track having supporting means for articles thereon and at least one pair of magnetically permeable rails parallel with each other and having at least one magnet extending between and directly engaging the lower portions of the rails whereby the upper surfaces of said rails act as poles of said magnet; and means for moving said pair of rails longitudinally and vertically with respect to the supporting means whereby any given point on the rails moves in a closed orbital path extending both above and below the supporting means, wherein the rails will simultaneously agitate the articles on the supporting means and advance them longitudinally along the track.

5. A magnetic conveyor comprising a longitudinally extending track having supporting means for articles thereon and at least one pair of magnetically permeable rails parallel with each other and having at least one magnet whereby the upper surfaces of said rails act as poles of said magnet; and means for moving said pair of rails with respect to the supporting means whereby any given point on the rails moves in a closed orbital path extending both above and below the supporting means, wherein the rails will advance the articles on the supporting means longitudinally along the track.

6. A magnetic conveyor including a longitudinally extending track comprising a plurality of magnetically permeable pole pieces, with at least one magnet associated with said pole pieces and adapted to cause a magnetic flux to pass through said pole pieces and through magnetically permeable articles disposed upon the track, with means for relatively shifting the flux path from said magnet through said pole pieces to alter the path of the magnetic flux through the pole pieces and move magnetically permeable articles thereon along the aforementioned track.

References Cited in the file of this patent

UNITED STATES PATENTS

| | | |
|---|---|---|
| 1,031,058 | Edwards | July 2, 1912 |
| 1,343,648 | Smith | June 15, 1920 |
| 2,479,709 | Arnold | Aug. 23, 1949 |